United States Patent Office 3,849,404
Patented Nov. 19, 1974

3,849,404
PURIFICATION OF 6,7 - DIHYDRO-17-HYDROXY-3-OXO - 3'H - CYCLOPROPA[6,7] - 17α-PREGNA-4,6-DIENE-21-CARBOXYLIC ACID γ-LACTONES
Joseph F. Zawadzki, Skokie, and Leland J. Chinn, Morton Grove, Ill., assignors to G. D. Searle & Co., Chicago, Ill.
No Drawing. Filed Mar. 9, 1973, Ser. No. 339,625
Int. Cl. C07c 167/42, 173/00
U.S. Cl. 260—239.57
3 Claims

ABSTRACT OF THE DISCLOSURE

A procedure whereby mixtures of 6α,7α- and 6β,7β-dihydro-17-hydroxy - 3 - oxo-3'H-cyclopropa[6,7] - 17α-pregna-4,6-diene-21-carboxylic acid γ-lactones are separated by means of complexes of these substances with hydroquinone is described herein.

17 - Hydroxy-3-oxo-17α-pregna-4,6-diene-21-carboxylic acid γ-lactone can be reacted with a number of reagents to introduce a fused cyclopropane ring in place of the double bond at the 6,7-position. However, the reaction is not stereoselective and a mixture of two isomeric compounds is obtained. These differ depending on whether the methylene group is on the α- or the β-side of the steroid molecule. When dimethylsulfoxonium methylide is used as the reagent to introduce the fused cyclopropane ring, the crude product obtained contains approximately 70% of the compound having the methylene group on the β-side of the steroid molecule with the remaining 30% being the corresponding α-isomer. Because of the close similarity between these two compounds, separation of the mixture by the usual techniques to give the individual isomers in a substantially pure state is difficult and involves loss of a considerable amount of material. It has now been found that such a mixture of isomers can be separated by means of hydroquinone complexes to give the individual compounds in a substantially pure state and the present application relates to such hydroquinone complexes and to a process for carrying out the separation of these two compounds by means of their complexes with hydroquinone. The present purification procedure, however, is not limited by the method used to obtain the mixture of isomers.

To be more specific with regard to this invention, the compounds involved in the separation have the following formulas

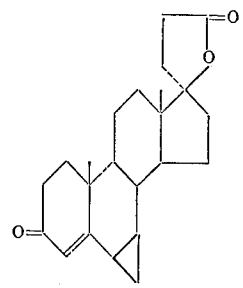

(I)

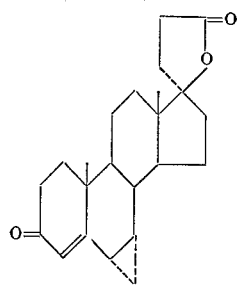

The systematic name for Compound I is 6α,7α-dihydro-17-hydroxy - 3 - oxo-3'H-cyclopropa[6,7]-17α-pregna-4,6-diene-21-carboxylic acid γ-lactone while the systematic name for Compound II is 6β,7β-dihydro-17-hydroxy-3-oxo-3'H - cyclopropa[6,7]-17α - pregna-4,6 - diene-21-carboxylic acid γ-lactone. For simplicity in the discussion, however, Compound I will also be referred to as the 6α,7α-dihydro-compound or as the β-methylene-compound while Compound II will be referred to as the 6β,7β-dihydro-compound or as the α-methylene-compound. Alternative abbreviated names for the substances involved would be identical to those appearing in the preceding sentence except that "isomer" would be substituted for "compound" in the names indicated earlier.

Both of the above compounds are pharmacologically useful showing activity as anti-DCA agents. More specifically, they are useful as diuretics and as anti-hypertensive agents. However, the activity of the two compounds is not identical and one isomer is more active than the other. Thus, it is useful to effect a separation of the isomers in order to obtain the individual compounds in a substantially pure state and thus avoid any questions as to the actual amount of active ingredient in the product. By substantially pure is meant that the ultimate material isolated contains the desired isomer in a concentration of 95% or better.

While, as indicated above, the individual isomers are themselves useful, they can also be converted to other useful materials, such as by opening the lactone ring. For example, if an alcoholic solution of the β-methylene-compound is heated with potassium hydroxide, there is obtained a salt of the following formula

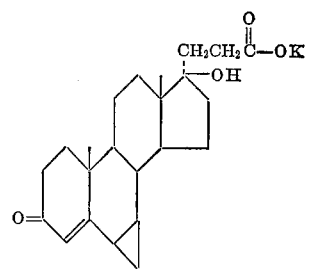

This compound is useful as a diuretic and this utility is evident from the results of an assay for its capacity to reduce the sodium-retaining effect of d-aldosterone, thereby reversing the renal electrolyte ratio, in dogs. A group of 6 female mongrels weighing between 15 and 22 kg. is used in this assay, and compounds are tested at 2 dose levels in each animal, as also is a reference standard, spironolactone. Controls are provided by twice subjecting each animal to the test procedure without administering either compound or standard. Further controls are provided by likewise repeating the procedure without administering compound, standard or aldosterone. The order in which the tests are carried out in the 6 test animals is randomized, and the tests are spaced at least 1 week apart to permit the animals to recover from the effect of the aldosterone previously administered. Spironolactone dosages are 2 and 8 mg./kg. (mpk.). Compound dosages are those which, on the basis of a preliminary assay in rats such as that described in U.S. 3,422,096 would be expected to produce responses roughly equivalent to those produced by the standard. In the event that any dose is insufficient to reduce the effect of the aldosterone, the assay is repeated at appropriately higher dose levels. The dogs are fed a regular diet at 4:00 p.m. on the day before each test and thereafter permitted tap water only (ad libitum) until the test is completed. Testing begins with the intramuscular injection in a hind limb of 0.2 ml. of sesame oil in which is dissolved 10 μg. of d-aldosterone if such is to be administered. The bladder is catheterized 30 minutes later and then rinsed with 40 ml. of distilled water, whereupon compound or standard, if either, is orally administered in a gelatin capsule and 10 ml./kg. of tap water is then immediately administered via stomach tube. Any urine excreted during the next 2½ hr. is collected and combined with urine which, at the end of this time and following administration of 5 ml./kg. of water as before, is removed from the bladder by catheterization. Excreted urine, if any, is again collected for 2½ hr. and combined with urine removed from the bladder by catheterization. The two urine specimens from each animal are analyzed for sodium and potassium; and the totals thereof are expressed as micro-equivalents per kg. Comparison of the mean log ($Na \times 10/K$) ratios ± 95% confidence limits determined from these totals serves as the index of anti-aldosterone potency in this assay. When potassium $6\alpha,7\alpha$ - dihydro - 17-hydroxy-3-oxo-3'H-cyclopropa[6,7]-$17\alpha$-pregna - 4,6-diene-21-carboxylate was assayed in the foregoing procedure, the results were as shown in Table I.

TABLE I

| Compound | Dose Aldosterone, μg. | Dose Compound, mpk. | Mean log ($Na \times 10/K$) |
|---|---|---|---|
| None (controls) | 0 | 0 | 1.272±0.105 |
| Do | 10 | 0 | 0.528±0.065 |
| Spironolactone | 10 | 2 | 0.900±0.160 |
| Do | 10 | 8 | 1.127±0.210 |
| Potassium $6\alpha,7\alpha$-dihydro-17-hydroxy-3-oxo-3'-Hcyclopropa-[6,7]-$17\alpha$-pregna-4,6-diene-21-carboxylate | 10 | 1 | 1.012±0.205 |
| Do | 10 | 4 | 1.248±0.170 |

It follows from the tabulated data that the anti-aldosterone response to the product of Example 4 is 304% of that to spironolactone, fiducial limits being 233–434%. Reversal of the aldosterone effect was statistically significant for test compound and standard ($P<0.05$ by paired $t$-test, using each dog as its own control).

The indicated compound can be administered in any convenient manner, including parenterally, albeit oral administration in the form of a tablet, capsule, solution, or suspension is preferred. Enteric coated tablets or capsules have the further advantage of delivering compound to the intestinal tract for optimum absorption in the duodenum and jejunum. Typical vehicles and/or excipients adapted to preparation of the foregoing dosage forms include water, ethanol, propylene glycol, corn oil, sesame oil, lactose, cellulose, calcium phosphate, dicalcium phosphate, tricalcium phosphate, sodium sulfate, calcium sulfate, corn starch, polyvinylpyrrolidone, acacia, methylcellulose, alkaline earth, stearates such as magnesium stearate, and hydrogenated castor oil.

Biologically effective amounts of the compound depend upon the purpose for which it is administered, the species involved, and individual response. Suggested daily dosages range from 0.2 to 4.0 mg./kg. orally.

As far as the separation of the lactones is concerned, it has been found that the compounds form complexes with a number of polyhydroxylated phenolic-type compounds such as hydroquinone, resorcinol, pyrocatechol, phloroglucinol and pyrogallol. However, it has been found that the complexes formed with hydroquinone have physical characteristics of such a type so as to make them particularly suitable for the separation of the two isomers and the present invention relates particularly to such a separation. The resulting complexes consist of substantially 1 mole of steroid for each 1 mole of hydroquinone.

Generally speaking, in the separation, a solution of the mixture of steroids is treated with a solution of hydroquinone. Because the hydroquinone complex of the $\alpha$-methylene-compound is more insoluble than that of the $\beta$-methylene-compound, this first complex forms and precipitates out of the solution. It is recognized that the complex of the $\alpha$-methylene-compound does not precipitate out exclusively and, in fact, the precipitate usually contains some of the complex of the $\beta$-methylene-compound. However, such a procedure does give a precipitate which is considerably enriched with regard to the $\alpha$-methylene-compound and leaves a mother liquor which is considerably enriched with regard to the $\beta$-methylene-compound than was the original mixture. That is, the precipitated solid contains a higher percentage of the $\alpha$-methylene-compound than was present in the original mixture while the mother liquor that remains contains a higher percentage of the $\beta$-methylene-compound than was present in the original mixture. The original procedure can then be repeated, with appropriate variations if necessary, on either of the enriched mixtures to give mixtures which are further enriched or to give one or the other of the isomers in a substantially pure state. Specifically, as indicated above, the separated complex of the $\alpha$-methylene-compound from the initial separation still contains significant quantities of the $\beta$-methylene-compound. This complex can be converted back to the free steroid by treatment with a mixture of sodium hydroxide and sodium sulfite in aqueous solution. The free steroid can then be treated with hydroquinone as before with appropriate adjustment for the proportion of $\alpha$-methylene-compound present. Any new precipitate can be treated again as above if it does not contain substantially pure $\alpha$-methylene-compound. Mother liquors can be similarly treated if they do not contain substantially pure $\beta$-methylene-compound.

The original mixture subjected to hydroquinone separation by the present procedure may contain impurities so that it is generally desirable to subject any reaction mixture to a preliminary purification to remove contaminating material. This can be accomplished by several methods. Thus, the original reaction mixture can be treated with benzene or a benzene-hexane mixture to extract out impurities. Alternatively, the entire reaction mixture can be subjected to a rapid chromatography in order to remove contaminants. In yet a third procedure, the original crude mixture, after a preliminary purification, can be treated with hydroquinone to precipitate out the complex of both isomers. The resulting solid complex is then treated with an appropriate solvent such as a mixture of diisopropyl ether and isopropyl acetate or diisopropyl ether and ethyl acetate to dissolve impurities and the remaining solid mixture is then converted back to the free steroid and subjected to the standard separation procedure.

In the general separation procedure, the steroid mixture and the hydroquinone are brought together in an appropriate solvent or mixture of solvents. Generally, appropriate reaction media are those which are inert to the reactants and sufficiently solubilizing to facilitate contact between them. Specifically, the hydroquinone would be dissolved in a polar solvent such as isopropyl acetate or ethyl acetate and this is added to a solution of the steroid mixture in a polar or a non-polar solvent. If a polar solvent is used to dissolve the steroid, it can be the same as that used to dissolve the hydroquinone; if a non-polar solvent is used to dissolve the steroid, benzene or a mixture of benzene and hexane are preferred. The reaction mixture is usually heated to promote contact between the two reactants and then cooled to precipitate out the insoluble complex. Polar solvents suitable for the present process are alkyl alkanoates such as those noted above and also include alkanols such as methanol, ethanol and 2-propanol; alkanones such as 2-propanone and 2-butanone; alkanenitriles such as acetonitrile; and water. These polar solvents can be used alone or in mixture with one another. Benzene and hexane have been indicated as useful non-polar solvents. The non-polar solvent is selected from among optionally-alkylated aromatic hydrocarbons such as benzene, toluene and xylene; aliphatic hydrocarbons such as hexane, heptane and cyclohexane; ethers such as dioxane; and polyhalogenated hydrocarbons such as methylene chloride, dichloroethane, chloroform and carbon tetrachloride. Mixtures of these non-polar solvents can also be used. The presence of the non-polar solvent decreases the solubility of the desired complex in the reaction medium.

As indicated earlier, the present process permits a successful separation because the hydroquinone complex of the α-methylene-compound is more insoluble than the hydroquinone complex of the β-methylene-compound under the conditions involved. As already indicated, the mixture of isomers is treated with hydroquinone. The amount of hydroquinone used can vary considerably. It is generally preferred to determine the amount of the α-methylene-compound present in a mixture and then add an equivalent amount of hydroquinone thereto. This would provide for the preferential formation and precipitation of the hydroquinone complex of the α-methylene-compound. However, it should be clear that a larger amount of hydroquinone could be used without any particular detrimental effects. Use of an excess in this way would insure complete complexing although use of more hydroquinone than would be necessary to complex all of the steroid present (both isomers) would not appear to serve any particular purpose. On the other hand, use of less hydroquinone than needed to complex all of the α-methylene-compound would still allow for the precipitation and separation of the complex of the α-methylene-compound. At most, it would be desirable not to use substantially less hydroquinone but this would be a detriment only because of the decreased efficiency of the resulting separation process.

Preferably, the procedure outlined in the preceding paragraph would be followed only in situations where a mixture contained at least about 20% of the α-methylene compound. While the procedure could be used when less of the α-methylene-compound is present there would be decreased efficiency in the separation. Here it would be more useful to use some procedure for purification whereby the β-methylene compound or its complex would precipitate. While the above discussion is primarily aimed at the initial separation of a crude reaction mixture, the principles involved would likewise be applicable to any mother liquors or any precipitates obtained during the separation procedure.

Once the concentration of the β-methylene-compound in a mixture is greater than about 80%, it is usually preferable to modify the procedure so as to favor the precipitation of the β-methylene-complex and this will enrich the mixture even further. Precipitation of the β-methylene-complex will occur here because the β-methylene-compound is present to a much greater extent and process conditions can be modified appropriately. In general, conditions can be adjusted to favor the precipitation of one or other of the isomers as follows. Thus, the complex of the α - methylene - compound is more insoluble so its precipitation is favored although it can be further favored by using only sufficient hydroquinone to complex the α-methylene-compound and by seeding the mixture with a crystal of the complex of the α-methylene-compound. On the other hand, the precipitation of the β-methylene-compound would be favored by the use of enough hydroquinone to complex all of the steroid present and by seeding the mixture with a crystal of complex of the β - methylene - compound. Precipitation of the complex of the β-methylene-compound is further favored by the presence of a trace of water in the solution. It must be recognized, however, that it will usually be necessary for the mixture to be substantially enriched (about 80% or more) in the β-methylene-compound before these techniques for the precipitation of the complex of the β-methylene-compound will work satisfactorily.

Once separation of the isomers is substantially achieved through the complexes, the individual enriched materials can be treated with aqueous sodium sulfite and base to regenerate the free steroid which then can be recrystallized or subjected to other techniques to effect any further desired purification.

The following examples are presented to further illustrate the present invention. They should not be construed as limiting it in spirit or in scope. In these examples, quantities by weight are indicated in grams, quantities by volume are indicated in milliliters (ml.), and temperatures are indicated in degrees Centigrade (° C.).

EXAMPLE 1

With the equipment set up to avoid contact with moisture, the following process is carried out. A mixture of 42.4 grams of a 50% dispersion of sodium hydride in mineral oil and 506 ml. of anhydrous dimethyl sulfoxide is heated and stirred at 40–50° C. until hydrogen evolution stops. The resulting dark solution is cooled to 17° C. and then enough triphenylmethane is added to produce an intense reddish coloration. Then, 121 grams of trimethylsulfoxonium chloride is added over a period of 1 hour while the temperature is maintained at 16–20° C. When the exothermic reaction stops and the reddish color disappears, the cooling bath is removed and the mixture is permitted to warm to room temperature over a period of 20 minutes. The resulting mixture is filtered in an inert atmosphere and the separated solid is washed four times with dry dimethyl sulfoxide.

The filtrate obtained in the preceding paragraph is maintained in an inert atmosphere and cooled to 17° C. while 200 grams of 17-hydroxy - 3 - oxo-17α-pregna-4,6-diene-21-carboxylic acid γ-lactone is added over a period of 2 minutes. The initial slurry is stirred at 13–15° C. for 1 hour and then allowed to warm to 25–27° C. at which temperature it is stirred for another 37 hours. The resulting red-brown solution is poured into 8 liters of ice water with stirring. The white precipitate which forms is separated by filtration and washed well with water until free of alkali.

The alkaline aqueous filtrate is acidified with acetic acid and the white precipitate which forms is separated by filtration and washed with water. The solid is then dissolved in 250 ml. of ethanol containing a trace of hydrochloric acid. The resulting solution is stirred at room temperature for 1 hour and then 5 ml. of an aqueous 10% potassium bicarbonate solution is added. The liquid is then evaporated under reduced pressure and the residue is dissolved in benzene and washed twice with aqueous 10% potassium bicarbonate solution followed by four washings with water and drying over sodium sulfate. Evaporation of the benzene leaves a white solid which is combined with the original precipitate separated. The resulting solid is a mixture of 6α,7α- and 6β,7β-dihydro-17-hydroxy - 3 - oxo - 3'H - cyclopropa[6,7]-17α-pregna - 4,6 - diene - 21 - carboxylic acid γ-lactone together with a small amount of unreacted starting material and some other impurities.

EXAMPLE 2A

The solid material obtained in Example 1 is extracted consecutively with 1–1000 ml. and 4–500 ml. portions of boiling benzene. Insoluble brown tar and an aqueous layer were separated and discarded. The combined benzene solutions are then mixed with an additional 400 ml. of benzene and stirred to reflux. To this solution is added 3400 ml. of hot hexane rapidly. A yellow tar precipitates. The mixture is stirred hot for 30 minutes and then allowed to cool gradually, finally in a refrigerator. The colorless supernatant liquid is decanted and the insoluble brown residue is rinsed with 70 ml. of a 1:1 benzene-hexane mixture. The residual tar is further extracted with a mixture of hot benzene and hot hexane several times and the resulting extract is added to the original solution after cooling and separation from any new tar. Analysis of an aliquot of this solution by gas liquid chromatography indicated that it contains 70.1% 6α,7α - dihydro - 17-hydroxy - 3 - oxo - 3'H - cyclopropa[6,7]-17α-pregna-4,6-diene-21-carboxylic acid γ-lactone, 28.4% of the 6β,7β- dihydro-isomer, 1.4% of unreacted starting material and minor amounts of unknown impurities.

In an alternate approach, crude solid material as obtained in Example 1 is extracted with 1–400 ml. and 4–100 ml. portions of benzene. The combined benzene extracts are washed with 4–50 ml. portions of water and separated from any tars which form. The benzene solution is then dried over sodium sulfate and concentrated to about one-half the original volume. The resulting solution is then treated with hydroquinone in the same manner as the material obtained in the first paragraph in order to effect a separation.

EXAMPLE 2B

The solution obtained in the first paragraph of Example 2A is stirred and heated to reflux while a solution of 16 grams of hydroquinone in 89 ml. of isopropyl acetate is added. Approximately 20% of the hydroquinone solution is added rapidly to produce a slight persistent turbidity but the addition is continued for 5 minutes during which time white crystals separate. Addition of the hydroquinone solution is then resumed at such a rate so that the complex crystallizes without persistence of turbidity in the solution. The mixture is then stirred under reflux for an additional 2 hours and the dense white solid is separated by filtration and washed with several hot portions of 1:1 benzene-hexane which contain a small amount of water. Analysis of this solid by gas liquid chromatography shows that it contains as 1:1 complex with hydroquinone, 59.2% of the α-methylene-compound, 39.8% of the β-methylene-compound and 1% of unreacted starting material.

The filtrate obtained above is allowed to stand for 16 hours during which time additional solid precipitates. The solution is decanted and analyzed by gas liquid chromatography to show a steroid content of 84.7% β-methylene-compound, 13.6% α-methylene-compound and 1.7% unreacted starting material.

EXAMPLE 2C

The final solution obtained in Example 2B is mixed with 1 part of water and stirred at reflux. Then, a hot solution of 36.4 grams of hydroquinone in 180 ml. of isopropyl acetate is added in such a way that precipitation is occurring before the main part of the solution is added over a period of 2.5 hours. The mixture is stirred at reflux for 2.5 hours before the solid is separated by filtration. The solid, which is a 1:1 complex of hydroquinone and steroid, is analyzed by a gas liquid chromatography which indicates that it contains 95.3% β-methylene-compound, 4.5% α-methylene-compound and 0.2% unreacted starting material.

EXAMPLE 2D

The solids obtained in Example 2C and at the end of Example 2B are combined and heated with 80 ml. of a 1:3 diisopropyl ether-isopropyl acetate mixture for 1 hour. The mixture is then cooled in a refrigerator for 5 hours and the solid is separated by filtration. This solid is then mixed with 1700 ml. of isopropyl acetate and there is added a mixture of 40 ml. of 10% aqueous sodium sulfite and 160 ml. of 5% aqueous sodium hydroxide solutions at room temperature until the solid dissolves. The aqueous layer is then separated and the organic layer is washed five times with an aqueous sodium sulfite-sodium hydroxide solution. The organic layer is then further washed to neutrality with water before it is dried over sodium sulfate. The solution is then concentrated at atmospheric pressure until crystallization occurs after which it is kept at room temperature for 45 minutes. The yellow supernatant liquid is decanted from the while solid which is washed by decantation with a mixture of isopropyl ether and isopropyl acetate. The solid is then dried and analyzed by gas liquid chromatography to show a content of 94.7% β-methylene-compound, 4.9% α-methylene-compound and 0.4% starting material. A second recrystallization from isopropyl acetate as above gives a solid melting at about 176.5–178° C. and containing 96.8% of the β-methylene-compound as determined by gas liquid chromatography assay.

EXAMPLE 2E

The solid obtained in the first paragraph of Example 2B is refluxed for 4 hours in benzene and then an equal volume of hexane is added and refluxing is resumed for an additional hour. The resulting mixture is filtered and the separated solid is treated three times more with benzene and hexane as above. The resulting residual solid is 91.5% hydroquinone complex of 6β,7β-dihydro-17-hydroxy-3-oxo-3'H-cyclopropa[6,7]-17α-pregna - 4,6 - diene-21-carboxylic acid γ-lactone as determined by gas liquid chromatography. The filtrates obtained above were combined and the solvent evaporated to leave a solid residue which contained 71.6% complex of the β-methylene-compound, 26.0% of the α-methylene-compound and 0.2% unreacted starting material.

The 91.5% pure α-methylene-compound complex contained above is converted back to the free steroid by treatment with aqueous sodium sulfite-sodium hydroxide as described in Example 2D. This material is subjected to repeated treatment with hydroquinone followed by reconversion to the free steroid to give 96.9% pure α-methylene-compound. A mixture of benzene and isopropyl acetate is used as the solvent for the first three hydroquinone treatments while isopropyl acetate alone is used as the solvent for the fourth and final hydroquinone treatment.

Alternately, the original crude complex in this example is converted to the free steroid by treatment with aqueous sodium sulfite-sodium hydroxide and this material is subjected to repeated treatment with hydroquinone followed by reconversion to the free steroid to give substantially pure α-methylene-compound.

EXAMPLE 3

200 grams of 17-hydroxy-3-oxo-17α-pregna-4,6-diene-21-carboxylic acid γ-lactone is reacted with dimethylsulfoxonium methylide according to the procedure described in Example 1. The crude product obtained is dissolved in a minimum of hot benzene, washed with water and then dried over sodium sulfate. The resulting benzene solution is heated and then treated with a hot solution of 59 grams of hydroquinone in 175 ml. of ethyl acetate. The solvent was then evaporated under reduced pressure and the brown gummy residue is triturated on a steam bath with a minimum of 1:2 isopropyl ether-isopropyl acetate solution. This solubilizes the tarry material and the mixture is filtered and the separated solid is washed with isopropyl ether-isopropyl acetate. The solid is then dissolved in 1300 ml. of ethyl acetate and 300 parts by volume of an aqueous 5% sodium hydroxide—5% sodium sulfite solution is added and the mixture is stirred. The ethyl acetate layer is then separated and washed 3 times with aqueous sodium hydroxide-sodium sulfite and then with water. The solvent is then evaporated under reduced pressure to leave a residue of α-methylene-compound and β-methylene-compound.

The resultant mixture is dissolved in 240 ml. of hot benzene and a hot solution of 10 grams of hydroquinone in 35 ml. of isopropyl acetate is added. The mixture is then allowed to cool to room temperature. A crystal of the complex of the α-methylene-compound is added and the mixture is allowed to stand at room temperature for 16 hours during which time the hydroquinone complex of the α-methylene-compound precipitates. The greater part of the liquid is removed by decantation and the solid is filtered and washed with benzene. The filtrate is combined with the decanted liquid and this is treated with 10 g. of hydroquinone in a minimum of hot isopropyl acetate. The mixture is seeded with a crystal of the hydroquinone complex of the β-methylene-compound and the mixture is allowed to stand for 16 hours. The precipitate which forms is separated by filtration and washed with benzene to give the β-methylene-compound in a purity of 97.5% as the complex with hydroquinone.

EXAMPLE 4

To a mixture of 100 parts of 6α, 7α-dihydro-17-hydroxy-3-oxo-3'H-cyclopropa[6,7] - 17α-pregna-4,6-diene-21-carboxylic acid γ-lactone and 960 parts of 2-propanol is added a solution of 15 parts of potassium hydroxide in 100 parts of water. The resultant mixture is heated at the boiling point under reflux in a nitrogen atmosphere for 1 hour while solution occurs. Solvent is thereupon stripped by vacuum distillation, and the residue is cooled and slurried with ethyl acetate. The crystalline material isolated from the slurry by filtration is potassium 6α,7α-dihydro-17-hydroxy-3-oxo-3' - H - cyclopropa[6,7]-17α-pregna-4,6-diene-21-carboxylate which, dried in air, melts at 248–250° C. with decomposition. The product has the formula

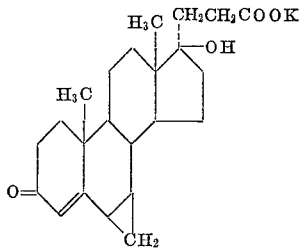

What is claimed is:

1. In a process for separating 6α,7α-dihydro-17-hydroxy-3-oxo - 3'H - cyclopropa[6,7] - 17α - pregna-4,6-diene-21-carboxylic acid γ-lactone and 6β,7β-dihydro-17-hydroxy - 3 - oxo-3'H-cyclopropa[6,7] - 17α - pregna-4,6-diene-21-carboxylic acid γ-lactone from each other, the step which comprises treating a mixture of substantially only the two compounds with hydroquinone in a medium comprising a polar solvent selected from among alkanols, alkyl alkanoates, alkanones, alkanenitriles, water and mixtures thereof in the optional presence of a non-polar solvent selected from optionally-alkylated benzene, alkanes, cycloalkanes, dioxane, and polyhalogenated hydrocarbons, and mixtures thereof to form a sparingly soluble complex of the 6β,7β-dihydro-compound.

2. In a process for isolating enriched 6α,7α-dihydro-17-hydroxy-3-oxo-3'H-cyclopropa[6,7] - 17α - pregna-4,6-diene-21-carboxylic acid γ-lactone from a crude mixture which contains substantially only 6α,7α- and 6β,7β-dihydro-17-hydroxy - 3 - oxo - 3'H - cyclopropa[6,7]-17α-pregna-4,6-diene-21-carboxylic acid γ-lactones, the steps which comprise treating a mixture which contains at least about 20% of the 6β,7β-dihydro-17-hydroxy-3-oxo-3'H-cyclopropa[6,7]-17α-pregna - 4,6 - diene-21-carboxylic acid γ-lactone with an amount of hydroquinone approximately equivalent to the amount of 6β,7β-dihydro-compound present, in a medium comprising a polar solvent selected from among alkanols, alkyl alkanoates, alkanones, alkanenitriles, water and mixtures thereof in the presence of a non-polar solvent selected from optionally-alkylated benzene, alkanes, cycloalkanes, polyhalogenated hydrocarbons, and mixtures thereof to form a sparingly soluble complex of the 6β,7β-dihydro-compound, and separating the precipitated solid to leave a residual solution which is enriched with regard to the 6α,7α-dihydro - 17 - hydroxy-3-oxo-3'H-cyclopropa[6,7]-17α-pregna-4,6-diene-21-carboxylic acid γ-lactone.

3. In a process for isolating enriched 6α,7α-dihydro-17-hydroxy-3-oxo-3'-H-cyclopropa[6,7] - 17α - pregna-4,6-diene-21-carboxylic acid γ-lactone from a crude mixture which contains substantially only 6α,7α- and 6β,7β-dihydro - 17 - hydroxy - 3 - oxo-3'H - cyclopropa[6,7]-17α-pregna-4,6-diene-21-carboxylic acid γ-lactones, the steps which comprise treating a mixture which contains at least about 20% of the 6β,7β-dihydro-17-hydroxy-3-oxo-3'H-cyclopropa[6,7]-17α-pregna - 4,6 - diene-21-carboxylic acid γ-lactone with an amount of hydroquinone approximately equivalent to the amount of the 6β,7β-dihydro-compound present, in a medium comprising a mixture of benzene, and isopropyl acetate to form a sparingly soluble complex of the 6β,7β-dihydro-compound, and separating the precipitated solid to leave a residual solution which is enriched with regard to the 6α,7α-dihydro-17-hydroxy-3-oxo-3'H-cyclopropa[6,7] - 17α - pregna-4,6-diene-21-carboxylic acid γ-lactone.

References Cited
UNITED STATES PATENTS
3,280,116  10/1966  Webber _____ 260—239.57

HENRY A. FRENCH, Primary Examiner

U.S. Cl. X.R.
260—397.1; 424—241